US012752507B2

(12) United States Patent
Ruoff et al.

(10) Patent No.: US 12,752,507 B2
(45) Date of Patent: Oct. 6, 2026

(54) METHOD FOR CUTTING, CREASING AND/OR EMBOSSING A CARDBOARD AND CARDBOARD PROCESSING MACHINE

(71) Applicant: BOBST MEX SA, Mex (CH)

(72) Inventors: Wolfgang Ruoff, Lörrach (DE); Ludovico Frati, Florence (IT)

(73) Assignee: BOBST MEX SA, Mex (CH)

( * ) Notice: Subject to any disclaimer, the term of this patent is extended or adjusted under 35 U.S.C. 154(b) by 0 days.

(21) Appl. No.: 18/798,362

(22) Filed: Aug. 8, 2024

(65) Prior Publication Data

US 2025/0050613 A1 Feb. 13, 2025

(30) Foreign Application Priority Data

Aug. 11, 2023 (EP) .................................... 23191035

(51) Int. Cl.
*B31F 1/10* (2006.01)
*B31F 1/07* (2006.01)
*B65H 35/08* (2006.01)

(52) U.S. Cl.
CPC .................. *B31F 1/07* (2013.01); *B31F 1/10* (2013.01); *B31F 2201/0715* (2013.01); *B31F 2201/0717* (2013.01); *B31F 2201/0792* (2013.01); *B31F 2201/0794* (2013.01)

(58) Field of Classification Search
CPC ...... B31F 1/07; B31F 1/10; B31F 2201/0715; B31F 2201/0717; B31F 2201/0792; B31F 2201/0794
See application file for complete search history.

(56) References Cited

U.S. PATENT DOCUMENTS

2006/0096065 A1 5/2006 Simon et al.
2014/0318340 A1 10/2014 Mochizuki et al.

FOREIGN PATENT DOCUMENTS

DE 19836211 A1 2/2000
EP 1026111 A2 * 8/2000 ......... B65H 23/1882
EP 3507097 B1 * 6/2020 ............... B65H 7/14
FR 2849649 A1 * 7/2004 ........... B65H 23/188
WO WO-9525014 A1 * 9/1995 ............ B41J 13/076

* cited by examiner

*Primary Examiner* — Christopher E Mahoney
*Assistant Examiner* — Marissa Ferguson-Samreth
(74) *Attorney, Agent, or Firm* — Bookoff McAndrews, PLLC

(57) ABSTRACT

A method is provided for cutting, creasing and/or embossing a cardboard in a cardboard processing machine comprising a rotary die cutting machine, the rotary die cutting machine comprising a first rotating cylinder and a second rotating cylinder, wherein the first and the second cylinder has a cutting, creasing and/or embossing area and a compensation area that extends along the circumference of the respective cylinder. A continuous cardboard web printed with a plurality of printed sections is run between the two cylinders in a processing direction, wherein a printing length (I) of a printed section is shorter than a circumference of the rotating cylinders. Afterwards the cardboard web is pulled back in a direction opposite to the processing direction to such an extent that after a full rotation of the rotating cylinders the cutting, creasing and/or embossing area of the rotating cylinders meets the beginning of the second printed section.

20 Claims, 2 Drawing Sheets

Figure 1:
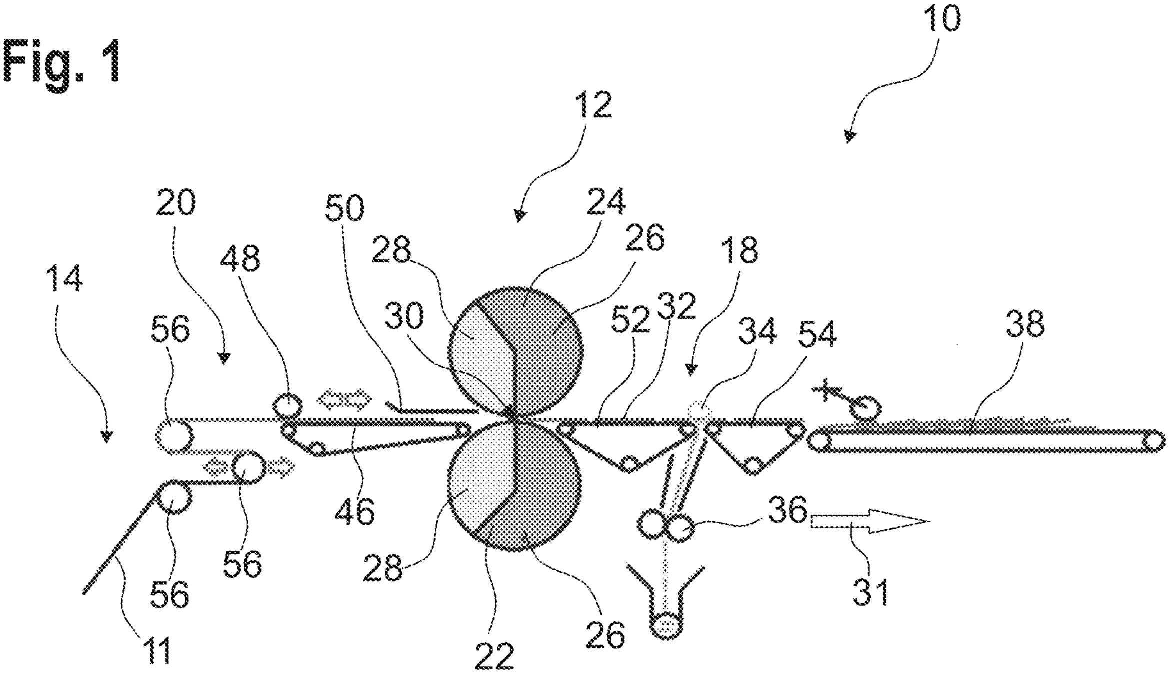

METHOD FOR CUTTING, CREASING AND/OR EMBOSSING A CARDBOARD AND CARDBOARD PROCESSING MACHINE

CROSS-REFERENCE TO RELATED APPLICATION(S)

This patent application claims the benefit of priority to European Application No. 23191035.7, filed on Aug. 11, 2023, the entirety of which is incorporated herein by reference.

The invention refers to a method for cutting, creasing and/or embossing a cardboard in a cardboard processing machine comprising a rotary die cutting machine as well as to a cardboard processing machine for comprising a rotary die cutting machine cutting, creasing and/or embossing a cardboard.

Processing means according to this description inter alia printing and converting.

Rotary die cutting machines comprise a first rotating cylinder and a second rotating cylinder. At least one of the rotating cylinders carries a flexible die or any kind of die cutting mean applicable on a die cutting cylinder either magnetic or not. A continuous printed cardboard web can be run between the two cylinders, wherein the cardboard web can be cut or creased upon rotation of the cylinders while the cardboard web is moving along a processing direction.

A challenge in the use of rotary die cutting machines is that the rotating cylinders have a fixed circumference, however, the cutting and printing length of the cardboard web to be processed usually varies in different printing jobs. It is thus necessary to synchronize the print of the cardboard web with a cutting, creasing and/or embossing section of the rotating cylinders.

It is a possible solution to print the images on the cardboard web with a distance to each other which is such that the length of a repetitive printed section including the unprinted section corresponds to the circumference of the rotating cylinders. However, this solution results in high waste because the unprinted sections on the cardboard web that have to be cut away.

It is thus an object of the present invention to provide a method for cutting, creasing and/or embossing a cardboard in a cardboard processing machine comprising a rotary die cutting machine as well as a cardboard processing machine, wherein a length of a printed section of a cardboard web can be synchronized with the cutting, creasing and/or embossing section of a rotating cylinder of the rotary die cutting machine in a simple and cost efficient manner.

This object is achieved by a method for cutting, creasing and/or embossing a cardboard in a cardboard processing machine comprising a rotary die cutting machine, the rotary die cutting machine comprising a first rotating cylinder and a second rotating cylinder, wherein each of the first and the second cylinder has a cutting, creasing and/or embossing area and a compensation area that extends along the circumference of the respective cylinder. A continuous cardboard web being printed with a plurality of repetitive printed sections is run between the two cylinders in a processing direction in order to be cut and/or creased, wherein a printing length of a printed section is shorter than a circumference of the rotating cylinders. Upon running between the two rotating cylinders, the cutting, creasing and/or embossing area of the first and the second cylinder rolls over a first printed section of the continuous cardboard web and cuts and/or creases the cardboard web along the first printed section. Afterwards the cardboard web is pulled back in a direction opposite to the processing direction to such an extent that after a full rotation of the rotating cylinders the cutting, creasing and/or embossing area of the rotating cylinders meets the beginning of second printed section, such that the cutting, creasing and/or embossing area of the first and the second cylinder rolls over the second printed section of the continuous cardboard web and cuts and/or creases the cardboard web along the second printed section.

The printing length of a printed section in the sense of the application is the length of the print itself plus the distance between two subsequent prints.

By means of the inventive method, different printing lengths can be easily synchronized with the rotating cylinders of a rotary die cutting machine without producing excessive material waste.

According to one embodiment, after cutting, creasing and/or embossing the cardboard web along the first printed section, the rotating cylinders roll over the second printed section with the compensation area and the cardboard web is pulled back before the cutting, creasing and/or embossing area of the rotation cylinders meets the second printed section. In other words, the cardboard web is pulled back between the rotating cylinders to synchronize the second printed section with the cutting, creasing and/or embossing area.

In another embodiment, a continuous transverse cut is made between the first printed section and the subsequent, second printed section. The cardboard web can be pulled back after cutting the cardboard web between the first printed section and the second printed section to such an extent that the cardboard web is temporarily disengaged from the rotary die cutting machine In particular, the compensation area of the rotating cylinders comprises no cutting, creasing and/or embossing means such that the rotating die cutting machine runs idly when the compensation areas of the rotating cylinders face each other.

The printed continuous cardboard web may be unrolled from a cardboard roll by means of an unwinding unit or may be fed into the cardboard processing machine directly after exiting a printing machine. Unrolling the cardboard web from a cardboard roll allows an offline processing of the cardboard web, i.e. a printing job can be performed at a different site than the cutting, creasing and/or embossing job. By feeding the cardboard into the cardboard processing machine directly after exiting a printing machine, an inline processing of the cardboard web is implemented, i. e. fully processed cardboard blanks can be fabricated in one continuous process. Thereby, short run jobs can be performed in a profitable manner.

Preferably, during synchronization, the cardboard web is moved back and forth in an oscillating manner. In other words, the cardboard web is moved back and forth dynamically. In particular, the cardboard web is never stopped during a production process. By moving the cardboard web back and forth in an oscillating manner, the distance along which the cardboard web has to moved is kept small, which keeps the process simple. It is possible to use different functions to optimize the movement or the accelerations. Typically, the movement is optimized to reduce the process accelerations.

The oscillating movement is preferably stopped when the rotating cylinders are synchronized with the subsequent printed section such that the cutting, creasing and/or embossing area of the rotating cylinders meets the beginning of the upcoming printed section, i.e. the board will have the same speed at the moment the board and the tools of the cylinders will touch again (perhaps a few mm before). Besides that there is no constant traveling speed besides during the cutting/creasing/embossing process, the rest of the movement is dynamic.

For example, the rotation speed of the rotating cylinders is constant. This is advantageous because the rotating cylinders are heavy and accelerating the rotating cylinders thus needs a lot of energy. However dynamic control of an angular position of cutting/creasing/embossing cylinders or tool can be applied to optimize the according process if needed.

The exact speed of the rotating cylinders depends in particular on the traveling speed of the cardboard web and the printing length of the printed sections. For example, the shorter the printing length, the faster the rotating cylinders must rotate to enable a proper processing of the cardboard web.

For example, if the traveling speed of the cardboard web is 100 m/min and the printing length is 400 mm, a rotating cylinder with a circumference of 800 mm has to rotate with a rotational speed of 200 m/min.

The feeding speed with which the continuous cardboard web is fed into the cardboard processing machine is slower than the rotation speed of the rotating cylinders. Thereby, the fact that the cardboard web is pulled back is compensated. In particular, it is avoided that a backlog of cardboard material occurs. In case the cardboard web is fed into the cardboard processing machine directly after exiting a printing machine, the rotating speed of the rotating cylinders has to be at least as high as the printing speed of the printing machine.

According to one embodiment, the cardboard web is separated into blanks along an outline of the printed sections. Thereby, excessive waste of material is avoided.

The object of the invention is further achieved by a cardboard processing machine for cutting, creasing and/or embossing a cardboard comprising a rotary die cutting machine, the rotary die cutting machine comprising a first rotating cylinder and a second rotating cylinder, wherein each of the first and the second cylinder has a cutting, creasing and/or embossing area and a compensation area that extends along the circumference of the respective cylinder, a feeding station in which a continuous cardboard web is fed into the cardboard processing machine, and an acceleration device which is configured to pull the cardboard web in a direction opposite to a processing direction and to accelerate it again for the next revolution.

According to a preferred embodiment of the invention for each revolution of a pair of cylinders (first and second cylinder) the following phases take place:

approx. 25-75% of the revolution of the cylinder, the web and the cylinder have the same speed, i.e. a synchronized movement—for the remaining area, the web will be dynamically slowed down, accelerated backwards, slowed down and accelerated forward to have the correct speed and position with regards to the cylinder.

As already disclosed with respect to the inventive method, the inventive cardboard processing machine allows synchronization of printed sections of a cardboard web with the rotating cylinders of the rotary die cutting machine in a simple and cost efficient manner.

The accelerating device is in particular arranged preceding to the rotary die cutting machine.

The acceleration device is in particular configured to move the cardboard web back and forth in an oscillating manner, thereby stopping the cardboard web from proceeding into the rotary die cutting machine.

The acceleration device comprises at least two deflection rollers over which the cardboard web is guided, wherein one of the deflection rollers is moveable in order to pull back the cardboard web in a direction opposite to a processing direction. In particular, the moveable roller can be moved back and forth in an oscillating word missing to move the cardboard web accordingly. Thereby, the synchronization may occur in a simple manner.

The acceleration device may further comprise a vacuum belt By means of the vacuum belt, a holding force can be applied to the cardboard web such that the cardboard web stays on a designated path, especially when a transverse cut has been made such that the cardboard web has a loose end.

In an alternative embodiment, the acceleration device may comprise two rolls between which the cardboard web is guided instead of a vacuum belt. More particularly a controlled roll with a nip roll might ensure, that the web follows the roll.

In addition, a guide plate may be arranged above the vacuum belt. The guide plate inhibits a lift-off of the cardboard web in the area of the vacuum belt. In other words, the guide plate ensures a proper contact between the cardboard web and the vacuum belt such that the holding force on the cardboard web is sufficient enough. Also, the guide plate supports feeding the cardboard web into the rotary die cutting machine between the rotating cylinders after a synchronization process, in particular in case a transverse cut has been made between the printed sections.

The cardboard processing machine preferably comprises a waste ejection station which is arranged subsequent to the rotary die cutting machine with respect to a processing direction. In the waste ejection station the cut away parts, also referred to as matrix, are separated from the cardboard web in order to provide the readily processed cardboard blanks.

The waste ejection station preferably comprises at least one ejection disk or any other deflection element (static or dynamic) that rolls over the cut cardboard web such that the matrix is separated from the cardboard blanks. Thereby, the risk of a premature break of the matrix is reduced compared to known solutions.

In an alternative embodiment, the waste ejection section comprises a matrix rewinder to continuously wind up the matrix. By means of a matrix rewinder, the matrix can be pulled off in an endless manner.

In a further embodiment, the waste ejection station may comprise a suction device.

In yet another embodiment in running direction a controlled wheel or other activator as ejection device is placed to eject blanks detected as defective. Such a defect could be a board or print defect detected by an inspection system. This inspection system can activate an ejection of a single blank or a set of blanks which have been detected as defect.

Figure 2:
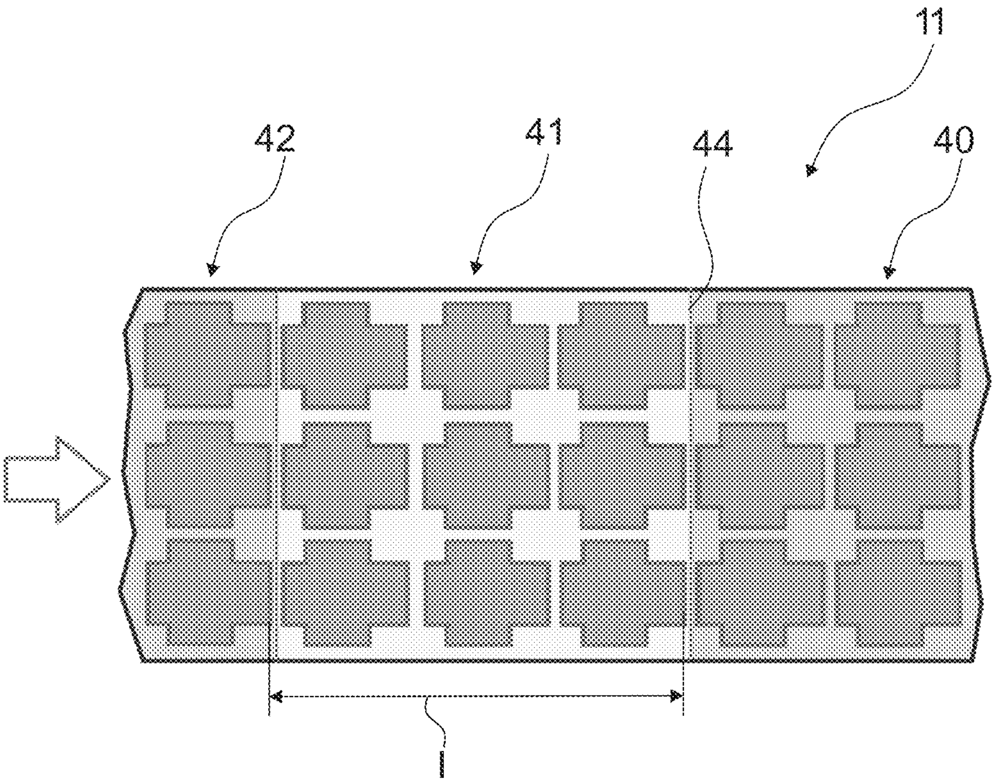
Figure 3:
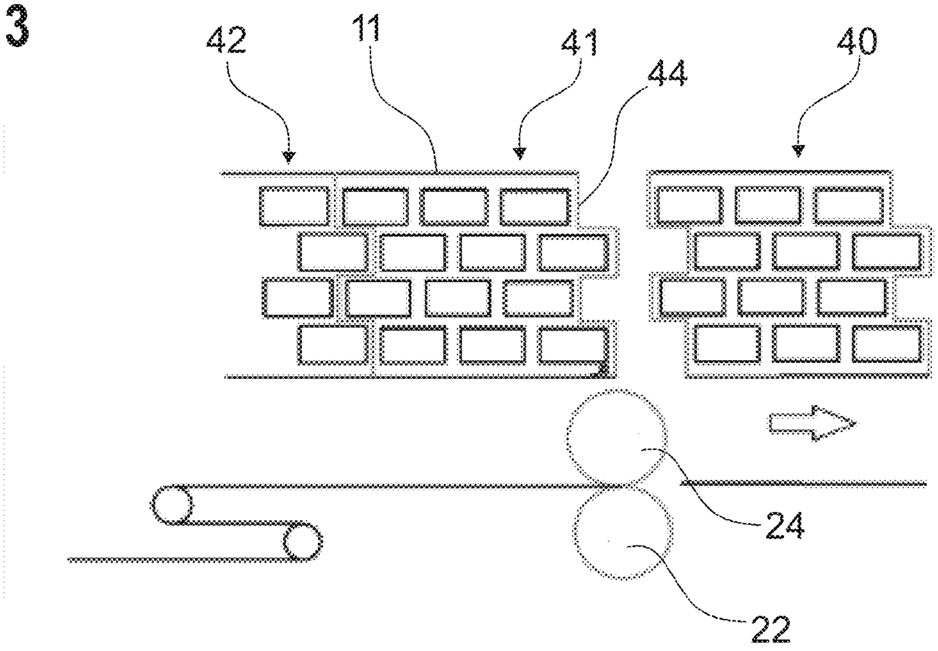
Figure 4:
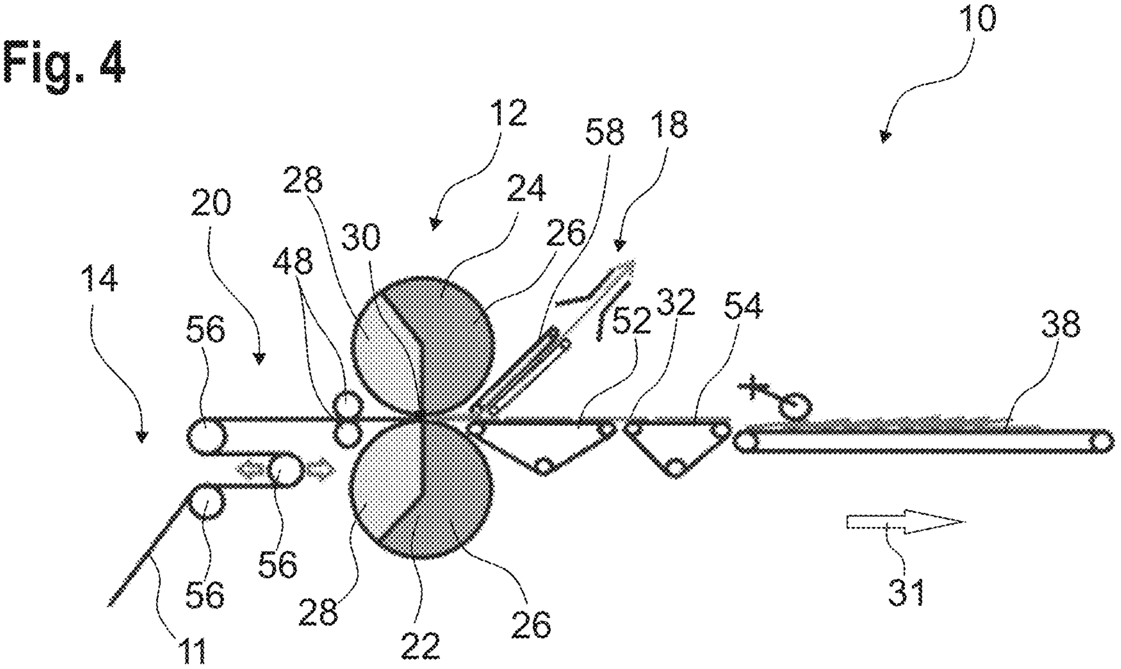

Further features and embodiments will become apparent from the following description and from the enclosed drawings depicting exemplary embodiments of the invention without any limitations to other possible embodiments which are also in the scope of the invention. In the drawings:

FIG. 1 schematically shows a cardboard processing machine according to the invention, FIG. 2 shows a top view of a printed cardboard web, FIG. 3 a further top view on a printed cardboard web in a relative position to a cardboard processing machine, and FIG. 4 schematically shows an alternative cardboard processing machine according to the invention.

FIG. 1 schematically shows a cardboard processing machine 10 for processing a cardboard web 11.

The cardboard processing machine 10 comprises a rotary die cutting machine 12, a feeding station 14, a waste ejection station 18 and an acceleration device 20.

In the feeding station 14 the continuous cardboard web 11 is fed into the cardboard processing machine 10.

The cardboard web 11 can be unrolled from a cardboard roll by means of an unwinding unit or it can be fed into the rotary die cutting machine 10 directly after exiting a printing machine.

The printing machine is for example a digital printing machine.

The rotary die cutting machine 12 comprises a first rotating cylinder 22 and a second rotating cylinder 24.

Each of the first cylinder 22 and the second cylinder 24 has a cutting, creasing and/or embossing area 26 and a compensation area 28 that extends along the circumference of the respective cylinder 22, 24.

The rotating cylinders 22, 24 are oriented such that upon rotation the cutting, creasing and/or embossing areas 26 face each other in an operating point 30 at which the cardboard web 11 is cut and/or creased.

The compensation areas 28 of the rotating cylinders 22, 24 face each other in the same way.

A flexible die which carries the cutting, creasing and/or embossing means is attached to the rotating cylinders 22, 24 in a magnetic manner. The flexible die is not shown in the Figures for reasons of simplicity. As mentioned above according to further embodiments the die can also be a solid cylinder with adjustable solid plates or other die cutting means as known by the person skilled in the art.

In one embodiment, the cutting, creasing and/or embossing area 26 of only one rotating cylinder 22, 24 carries cutting, creasing and/or embossing means, while the cutting, creasing and/or embossing area 26 of the other cylinder consists of a hardened section.

For a proper creasing, however, a male and a female creasing means are required. For cutting, there is no need for a specific female cutting means.

The cardboard web 11 is run between the two cylinders 22, 24 in a processing direction in order to be cut and/or creased. The processing direction is indicated in FIG. 1 by arrow 31.

In the cardboard processing machine 10 according to the depicted embodiment, cutting and creasing is done in the same rotary die cutting machine 12. However, it is also possible that the cardboard processing machine 12 comprises two rotary die cutting machines, one for cutting and one for creasing.

After cutting the cardboard web 11, the waste material is separated from the cardboard blanks 32 in the waste ejection station 18, which is arranged subsequent to the rotary die cutting machine 12 with respect to a processing direction.

In the depicted embodiment, the waste ejection station 18 comprises at least one deflection device, for example an ejection disk 34 that rolls over the cut cardboard web 11. In particular, the waste ejection station 18 comprises a plurality of ejection disks 34 that are distributed along a direction transverse to the processing direction of the cardboard web 11.

The waste ejection station 18 also comprises a shredder 36 in which the ejected cardboard matrix parts are shredded.

After the cardboard blanks 32 are separated from waste, the cardboard blanks 32 are arranged on a conveying belt 38 for further transport.

FIG. 2 shows a section of a continuous cardboard web 11.

The continuous cardboard web 11 is printed with a plurality of repetitive printed sections 40, 41, 42.

The length of the printed sections 40, 41, 42 differs in different printing jobs. In most cases, a printing length l of a printed section 40, 41, 42 is shorter than a circumference of the rotating cylinders 22, 24.

In particular, the circumferential length of the cutting, creasing and/or embossing area 26 and the compensation area 28 depends on the printing length l of the printed sections.

For example, if the printing length is 400 mm and the rotating cylinders 22, 24 have a circumference of 800 mm, the length of the cutting, creasing and/or embossing area 26 and the compensation area 28 are equal. However, this ratio differs for different production jobs.

As indicated in FIG. 2, the printing length l of a printed section 40, 41, 42 is the length of a print itself plus the distance between two subsequent prints.

When the printing length l does not exactly correspond with the circumference of the rotating cylinders 22, 24, the cardboard web 11 has to be synchronized with the cutting, creasing and/or embossing area 26 of the rotating cylinders 22, 24.

Such a synchronization is achieved as explained in the following:

At first, the cardboard web 11 runs between the two rotating cylinders 22, 24, whereby the cutting, creasing and/or embossing area 26 of the first and the second cylinder 22, 24 rolls over a first printed section 40 of the continuous cardboard web 11 and cuts and/or creases the cardboard web 11 along the first printed section 40.

Upon running between the two rotating cylinders 22, 24 a continuous transverse cut 44 is made between the first printed section 40 and a subsequent, second printed section 41.

In the embodiment depicted in FIG. 2 the transverse cut 44 is a straight cut.

However, in an alternative embodiment that is shown in FIG. 3 the transverse cut 44 is made along an outline of the printed sections 40, 41, 42. This has the purpose to avoid excessive waste which would occur in case of a straight cut at the beginning and the ending of a blank 32.

In both cases, there is a slight distance between the transverse cut 44 and the printed images. Further, it is also possible that such distance equals close to zero which represents a continuous printing/nesting.

The transverse cut 44 serves to separate the cardboard web 11 into blanks 32.

After the transverse cut 44 is made, the cardboard web 11, in particular the cardboard web 11 that has not yet entered the rotary die cutting machine 12, is decelerated and pulled back in a direction opposite to the processing direction.

Thereby, a synchronization of the position of the second printed section 41 with the cutting, creasing and/or embossing area 26 is possible.

More precisely, the cardboard web 11 is pulled back to such an extent that after a full rotation of the rotating cylinders 22, 24 the cutting, creasing and/or embossing area 26 of the rotating cylinders 22, 24 meets the beginning of the second printed section 41, such that the cutting, creasing and/or embossing area 26 of the first and the second cylinder 22, 24 rolls over the second printed section 41 of the continuous cardboard web 11 and cuts and/or creases the cardboard web 11 along the second printed section 41.

In other words, the second printed section 41 is held out of engagement with the rotary die cutting machine 12 until the compensation areas 28 of the cylinders 22, 24 have passed the operation point 30.

When the second printed section 41 meets the cutting, creasing and/or embossing area 26 of the rotation cylinders 22, 24, the rotation speed of the cylinders 22, 24 and the travelling speed of the cardboard web 1 should be equal to avoid ripping the cardboard material.

The rotation speed of the rotating cylinders 22, 24 is constant.

During synchronization, the cardboard web 11 is moved back and forth in an oscillating manner.

In FIG. 1, the cardboard web 11 is shown in a pulled back position with a distance to the rotary die cutting machine 12.

Afterwards the same process is performed for the subsequent, third printed section 42.

In a further embodiment, which is not depicted for reasons of simplicity, the transverse cut 44 is omitted. Instead, after cutting, creasing and/or embossing the cardboard web 11 along the first printed section 40, the rotating cylinders 22, 24 roll over the second printed section 41 with the compensation area 28. While the cardboard web 11 is in contact with the compensation area 28, no cutting, creasing and/or embossing of the cardboard web 11 happens. The cardboard web 11 is pulled back before the cutting, creasing and/or embossing area 26 of the rotation cylinders 22, 24 meets the second printed section. Thereby, a synchronization of the cardboard web 11 with the cutting, creasing and/or embossing area 26 is achieved.

In order to pull the cardboard web 11 in a direction opposite to the processing direction, the cardboard processing machine 10 comprises the acceleration device 20. In particular, the acceleration device 20 is configured to pull back and accelerate the cardboard web 11.

The acceleration device 20 is arranged preceding to the rotary die cutting machine 12.

In the depicted embodiment, the acceleration device 20 comprises three deflection rollers over which the cardboard web 11 is guided.

One of the deflection rollers 56, in particular, viewed along a vertical direction, the middle deflection roller 56, is moveable in order to pull back the cardboard web 11 in a direction opposite to a processing direction.

In particular, the deflection roller 56 is moveable in a horizontal direction.

More precisely, the deflection roller 56 is moveable in an oscillating manner.

The acceleration device 20 also comprises a vacuum belt 46, which is configured to hold the cardboard web 11 such that the cardboard web 11 would not lift off.

To ensure a proper engagement of the cardboard web 11 with the vacuum belt 46, the acceleration device 20 comprises a pressure roll 48 which is arranged at the beginning of a contact area of the vacuum belt 46. The pressure roll 48 in particular presses the cardboard web 11 down on the vacuum belt 46.

In an alternative embodiment the acceleration device does not comprise a vacuum belt but a pressure roll or two rolls only.

Moreover, the acceleration device 20 comprises a guide plate 50 that is arranged above the vacuum belt 46. The guide plate 50 also contributes to ensuring a proper engagement between the cardboard web 11 and the vacuum belt 46.

The guide plate 50 exceeds the vacuum belt 46 in a direction towards the rotary die cutting machine 12 such that the guide plate 50 supports feeding the cardboard web into the rotary die cutting machine 12 between the rotating cylinders 22, 24 after a synchronization process.

Subsequently to the rotary die cutting machine 12, the cardboard processing machine 10 may comprise a further vacuum belt 52 which supports pulling the cardboard blanks 32 out of the rotary die cutting machine 12.

A further vacuum belt 54 is configured for separating the cardboard blanks 32.

When there is a difference between the printing length of the printing sections 40, 41, 42 and the circumference of the rotating cylinders, i.e. when a synchronization is necessary, the feeding speed with which the continuous cardboard web 11 is fed into the cardboard processing machine 10 is slower than the rotation speed of the rotating cylinders 22, 24 in order to compensate for the cardboard web 11 being pulled back during the synchronization process.

FIG. 4 schematically shows a further cardboard processing machine 10. For components known from the previous embodiment, the same reference signs are used and reference is made to the preceding explanations.

The embodiment of FIG. 4 differs from the embodiment of FIG. 1 in the waste ejection station 18.

In particular, instead of an ejection disc 34, the waste ejection station 18 comprises a matrix rewinder 58 to continuously wind up the matrix.

In that case, the transverse cut 44 is omitted.

Also, instead of a vacuum belt 46 and a guide plate 50, the acceleration device 20 comprises two pressure rolls 48.

The invention claimed is:

1. A method for cutting, creasing and/or embossing a cardboard in a cardboard processing machine comprising a rotary die cutting machine, the rotary die cutting machine comprising a first rotating cylinder and a second rotating cylinder, wherein each of the first rotating cylinder and the second rotating cylinder has a cutting, creasing and/or embossing area and a compensation area that extends along a circumference of the respective cylinder, the method comprising:

wherein a continuous cardboard web being printed with a plurality of repetitive printed sections is run between the two cylinders in a processing direction in order to be cut and/or creased, wherein a printing length of a printed section is shorter than a circumference of the first rotating and second rotating cylinders, wherein upon running between the first rotating and second rotating cylinders, the cutting, creasing and/or embossing area of the first rotating cylinder and the second rotating cylinder rolls over a first printed section of the continuous cardboard web and cuts and/or creases the cardboard web along the first printed section, and afterwards the cardboard web is pulled back by an acceleration device in a direction opposite to the processing direction to such an extent that after a full rotation of the first rotating and second rotating cylinders the cutting, creasing and/or embossing area of the first rotating and second rotating cylinders meets a beginning of a second printed section, such that the cutting, creasing and/or embossing area of the first rotating cylinder and the second rotating cylinder rolls over the second printed section of the continuous cardboard web and cuts and/or creases the cardboard web along the second printed section, wherein during a single synchronization process, the cardboard web is moved back and forth in an oscillating manner by the acceleration device, and wherein the acceleration device comprises a deflection roller that moves in the oscillating manner to pull the cardboard web.

2. The method according to claim 1, wherein after cutting, creasing and/or embossing the cardboard web along the first printed section, the rotating cylinders roll over the second printed section with the compensation area and the cardboard web is pulled back before the cutting, creasing and/or embossing area of the rotation cylinders meets the second printed section.

3. The method according to claim 1, wherein a continuous transverse cut is made between the first printed section and the second printed section, wherein the second printed section is subsequent to the first printed section.

4. The method according to claim 1, wherein the printed continuous cardboard web is unrolled from a cardboard roll by means of an unwinding unit or is fed into the cardboard processing machine directly after exiting a printing machine.

5. The method according to claim 1, wherein a rotation speed of the rotating cylinders is constant.

6. The method according to claim 1, wherein a feeding speed with which the continuous cardboard web is fed into the cardboard processing machine is slower than a rotation speed of the first rotating and second rotating cylinders.

7. The method according to claim 1, wherein the cardboard web is separated into blanks along an outline of the printed sections.

8. A cardboard processing machine for cutting, creasing and/or embossing a cardboard, the cardboard processing machine comprising:

a rotary die cutting machine, the rotary die cutting machine comprising a first rotating cylinder and a second rotating cylinder, wherein each of the first rotating cylinder and the second rotating cylinder has a cutting, creasing and/or embossing area and a compensation area that extends along a circumference of the respective cylinder, a feeding station in which a continuous cardboard web is fed into the cardboard processing machine, and an acceleration device which is configured to pull the cardboard web in a direction opposite to a processing direction in an oscillating manner during a single synchronization process, wherein the acceleration device comprises a deflection roller that moves in the oscillating manner to pull the cardboard web.

9. The cardboard processing machine according to claim 8, wherein the acceleration device comprises at least two deflection rollers over which the cardboard web is guided, wherein one of the deflection rollers is moveable in order to pull back the cardboard web in the direction opposite to the processing direction.

10. The cardboard processing machine according to claim 8, wherein the acceleration device comprises a vacuum belt.

11. The cardboard processing machine according to claim 10, wherein the acceleration device comprises a guide plate arranged above the vacuum belt, wherein the guide plate extends beyond the vacuum belt in a direction towards the rotary die cutting machine to support feeding the cardboard web into the rotary die cutting machine after the synchronization process.

12. The cardboard processing machine according to claim 10, wherein the acceleration device comprises a pressure roll arranged at a beginning of a contact area of the vacuum belt, wherein the pressure roll presses the cardboard web down on the vacuum belt.

13. The cardboard processing machine according to claim 10, wherein the vacuum belt is configured to hold the cardboard web such that the cardboard web does not lift off the vacuum belt.

14. The cardboard processing machine according to claim 8, wherein the cardboard processing machine comprises a waste ejection station which is arranged subsequent to the rotary die cutting machine with respect to the processing direction.

15. The cardboard processing machine according to claim 14, wherein the waste ejection station comprises at least one deflection device, including an ejection disk that rolls over the cut cardboard web.

16. The cardboard processing machine according to claim 14, wherein the waste ejection station comprises a matrix rewinder to continuously wind up the matrix.

17. The cardboard processing machine according to claim 9, wherein the acceleration device comprises three deflection rollers, wherein a middle deflection roller among the three deflection rollers is moveable in a horizontal direction.

18. The cardboard processing machine according to claim 8, wherein during the single synchronization process, the acceleration device is configured to dynamically slow down the cardboard web, accelerate the cardboard web backwards, slow down the cardboard web, and accelerate the cardboard web forward to have a correct speed and position with regard to the first rotating cylinder and the second rotating cylinder.

19. A cardboard processing machine for cutting, creasing and/or embossing a cardboard, the cardboard processing machine comprising:

a rotary die cutting machine, the rotary die cutting machine comprising a first rotating cylinder and a second rotating cylinder, wherein each of the first rotating cylinder and the second rotating cylinder has a cutting, creasing and/or embossing area and a compensation area that extends along a circumference of the respective cylinder, a feeding station in which a continuous cardboard web is fed into the cardboard processing machine, and an acceleration device which is configured to pull the cardboard web in a direction opposite to a processing direction in an oscillating manner during a single synchronization process, wherein during the single synchronization process, the acceleration device is configured to dynamically slow down the cardboard web, accelerate the cardboard web backwards, slow down the cardboard web, and accelerate the cardboard web forward to have a correct speed and position with regard to the first rotating cylinder and the second rotating cylinder.

20. The cardboard processing machine according to claim 19, wherein the acceleration device comprises a deflection roller that moves in the oscillating manner to pull the cardboard web.

* * * * *